United States Patent [19]
Becker

[11] Patent Number: 6,059,056
[45] Date of Patent: May 9, 2000

[54] STEERING SYSTEM FOR A MULTIPLE-AXLE VEHICLE

[75] Inventor: Otto Becker, Varel, Germany

[73] Assignee: Grove U.S.L.L.C., Shady Grove, Pa.

[21] Appl. No.: 09/056,876

[22] Filed: Apr. 8, 1998

[30] Foreign Application Priority Data

Apr. 8, 1997 [DE] Germany ............... 197 14 485

[51] Int. Cl.$^7$ .................................................. B62D 61/10
[52] U.S. Cl. ................ 180/24.01; 180/410; 180/411
[58] Field of Search ........................... 280/98, 100, 101; 180/24.01, 22, 21, 400, 410, 411, 414, 419, 424

[56] References Cited

U.S. PATENT DOCUMENTS

| | | |
|---|---|---|
| 1,709,741 | 4/1929 | Romine . |
| 3,486,576 | 12/1969 | Breon et al. . |
| 3,903,979 | 9/1975 | Perrotin ............................ 180/24.01 |
| 4,186,814 | 2/1980 | Hart ................................. 180/24.01 |
| 4,372,407 | 2/1983 | McColl . |
| 4,591,177 | 5/1986 | Perlini ............................. 180/24.01 |
| 5,366,035 | 11/1994 | Hayashida et al. . |
| 5,390,945 | 2/1995 | Orr . |
| 5,392,872 | 2/1995 | Ducote . |
| 5,417,299 | 5/1995 | Pillar et al. . |
| 5,430,650 | 7/1995 | Susuki et al. . |
| 5,477,937 | 12/1995 | Chagnon . |
| 5,479,999 | 1/1996 | Proia . |
| 5,501,288 | 3/1996 | Ducote . |
| 5,607,028 | 3/1997 | Braun et al. . |

FOREIGN PATENT DOCUMENTS

| | | |
|---|---|---|
| 39-18986A1 | 12/1989 | Germany . |
| 39-11885A1 | 10/1990 | Germany . |
| 41-19641A1 | 12/1992 | Germany . |
| 42-21973A1 | 1/1994 | Germany . |
| 43-39372A1 | 6/1994 | Germany . |

*Primary Examiner*—Brian L. Johnson
*Assistant Examiner*—Avraham H. Lerner
*Attorney, Agent, or Firm*—Birch, Stewart, Kolasch & Birch, LLP

[57] ABSTRACT

A steering system for a multiple-axle vehicle includes a front axle steering arrangement steering at least one pair of front wheels connected to at least one front axle, a middle axle steering arrangement steering at least one pair of middle wheels connected to at least one middle axle, and a first connector operationally connecting the middle axle steering arrangement to the front axle steering arrangement. A rear axle steering arrangement steers at least one pair of rear wheels connected to at least one rear axle, and an adjustable connector adjustably connects the middle axle steering arrangement to the rear axle steering arrangement. A controller controls the middle axle steering arrangement based on sensor output indicative of a ratio of a steering deflection angle of the front wheels to a steering deflection angle of the rear wheels.

33 Claims, 9 Drawing Sheets

FIG. 3
a) 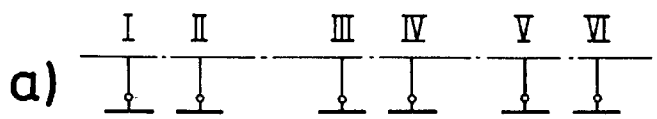 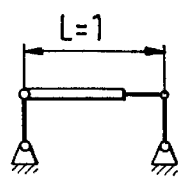
b) 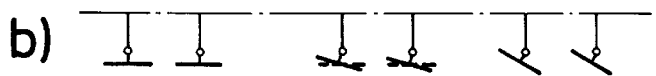 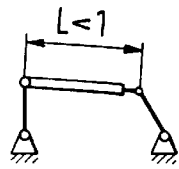
c) 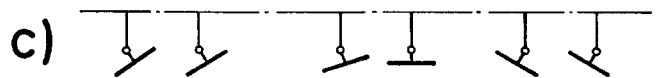 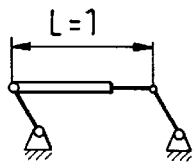
d) 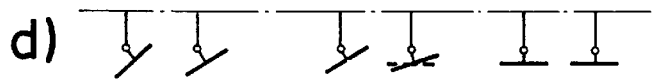 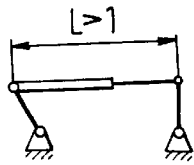
e) 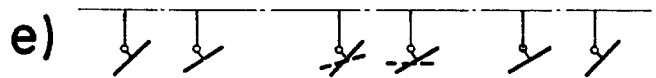 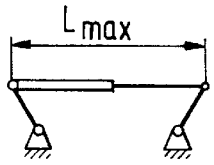
f) 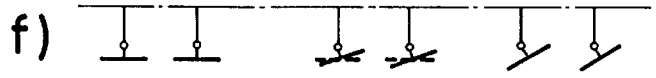 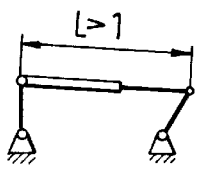
g) 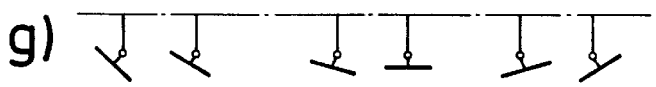 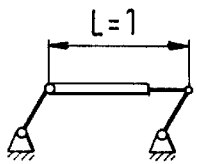
h) 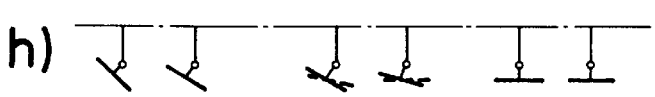 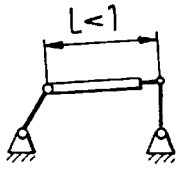
i)  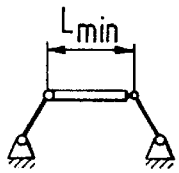

STEERING SYSTEM FOR A MULTIPLE-AXLE VEHICLE

BACKGROUND OF THE INVENTION

1. Field of the Invention

The present invention relates to a steering system for a multiple-axle vehicle having at least one front, one middle and one rear axle arrangement which are steerable via a steering rod/cylinder arrangement mutually and/or separately. Each axle arrangement may be formed by at lest one axle having two wheels, two axles having four wheels, and/or three axles having six wheels.

2. Description of the Prior Art

A demand exists for multiple-axle vehicles, for example trucks or crane vehicles, wherein the wheels, when cornering, generate the least possible friction on the road surface. The intention is to adjust the steered deflection (i.e., steering angle) of each wheel so that, where possible, the wheel rolls with hardly any movement lateral to its rolling direction. In the ideal situation, all wheels of the vehicle move in a circular path about a steering pole, which optimally is the sole point of intersection of the axes of rotation of all the wheels.

For trucks and similar vehicles designed for relatively fast and relatively light on road travel, but not for mobile crane vehicles (e.g., crane vehicles having more than four axles), steering systems have been developed which, with the aid of electronic controls, provide such an optimum steered deflection of all the wheels. Known in this case is an independent steering system in which the steering angles of the first and last axle are sensed by potentiometers. Via computer programs, the necessary steering deflections are established for the wheels of the remaining axles, and then the wheels are steered electro-hydraulically. No mechanical connections exists among the axles, i.e., the axles or wheels of an axle line are steered independently of each other.

To maneuver such vehicles in tight situations on the construction site and on the road, it is necessary to equip them with a separate steering device. In such separate steering arrangements, for example, the wheels of a front axle system are deflected more or less than those of the rear axle system; wherein the steering arrangements of the axle systems should permit independent adjustment.

From German patent application DE 41 19 641 A1, a device for selecting the steering of a mobile crane is known. This steering system includes a selector unit permitting decoupling of the steering of the front and rear axle arrangements, resulting in improved steerability for on road and/or off road operation.

German patent application DE 42 21 973 A1 discloses a steering system for a mobile crane intended to permit, on the one hand, a stable driving response when on road and, on the other, adequate wheel deflection in tight cornering. For this purpose, a gear segment lever is integrated in the steering rod arrangement, the toothing of which is designed so that in straight-ahead travel the steering effect is less than in tight cornering.

The disadvantage of separate steering devices known hitherto is that when, in tight cornering, one of the axle or wheel arrangements (e.g., the front or rear wheel arrangement) is deflected more than the other, the steering system goes "out of tune."

On a vehicle having a front, a middle and a rear axle arrangement the steering pole as defined above is displaced when the wheels of one of the axle arrangements are more strongly deflected than the wheels of the other axle arrangements. If, for instance, the rear wheels are deflected more than the front wheels then the axes of rotation of the front and rear wheels intersect at a point which is shifted toward the front of the vehicle. The axes of rotation of the wheels of the middle axle arrangement fail to continue to pass through this point, however, causing the wheels of the middle axles to scrub laterally on the surface of the ground resulting in friction.

One special movement often required of crane vehicles off-road, e.g., on site, is what is called "dog trotting" or "crab steering." In dog trotting, the vehicle moves sideways and to the front or rear without changing the direction of its longitudinal axis. The intention here is that all wheels having ground contact receive the same steered deflection. On conventional steering systems, however, this is not possible with all wheels since the steering kinematics also need to be designed for stable on road travel. Conventionally at least the middle axles need to be designed as rigid axles or as axles having only a slight deflection. Consequently, in "dog trotting," the edge deflection angles of the first and last axles greatly differ from those of the middle axles.

This is why the wheels of the middle axles are normally lifted from ground contact during dog trotting. Unfortunately, this results in higher axle loading of the first and last axles, and necessitates higher steering forces.

SUMMARY OF THE INVENTION

An object of the present invention is to provide a steering system for a multiple-axle vehicle which avoids the drawbacks discussed above.

Another object of the present invention is to provide a steering system for a multiple-axle vehicle which reduces wheel friction and thus wheel wear in tight cornering.

A further object of the present invention is to provide a steering system for a multiple-axle vehicle which ensures that all wheels remain in ground contact even when travelling skew without rotation of the vehicle's longitudinal axis (dog trotting).

A still further object of the present invention is to provide a steering system for a multiple-axle vehicle which achieves any one of the above described objects and provides stable on road driving.

Another object of the present invention is to provide a steering system for a multiple-axle vehicle which achieves any one of the above described objects without complicated independent steering systems.

These and other objects are achieved by providing A steering system for a multiple-axle vehicle, comprising: a front axle steering arrangement steering at least one pair of front wheels connected to at least one front axle; a middle axle steering arrangement steering at least one pair of middle wheels connected to at least one middle axle; a first connector operationally connecting said middle axle steering arrangement to said front axle steering arrangement; a rear axle steering arrangement steering at least one pair of rear wheels connected to at least one rear axle; and an adjustable connector adjustably connecting said middle axle steering arrangement to said rear axle steering arrangement.

These and other objects are further achieved by providing steering system for a multiple-axle vehicle, comprising: a front axle steering arrangement steering at least one pair of front wheels connected to at least one front axle; a middle axle steering arrangement steering at least one pair of middle wheels connected to at least one middle axle; a first connector operationally connecting said middle axle steering arrangement to said front steering axle arrangement; a rear axle steering arrangement steering at least one pair of rear wheels connected to at least one rear axle; and a second connector operationally connecting said middle axle steering arrangement to said rear axle steering arrangement; determining means for determining a ratio of a steering deflection angle of said front wheels to a steering deflection angle of said rear wheels; and a controller controlling said middle axle steering arrangement based on said ratio.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3a)–3i) are examples for the positions of the lockable, telescopic steering rod for various wheel deflections;

DESCRIPTION OF THE PREFERRED EMBODIMENTS

Figure 4:
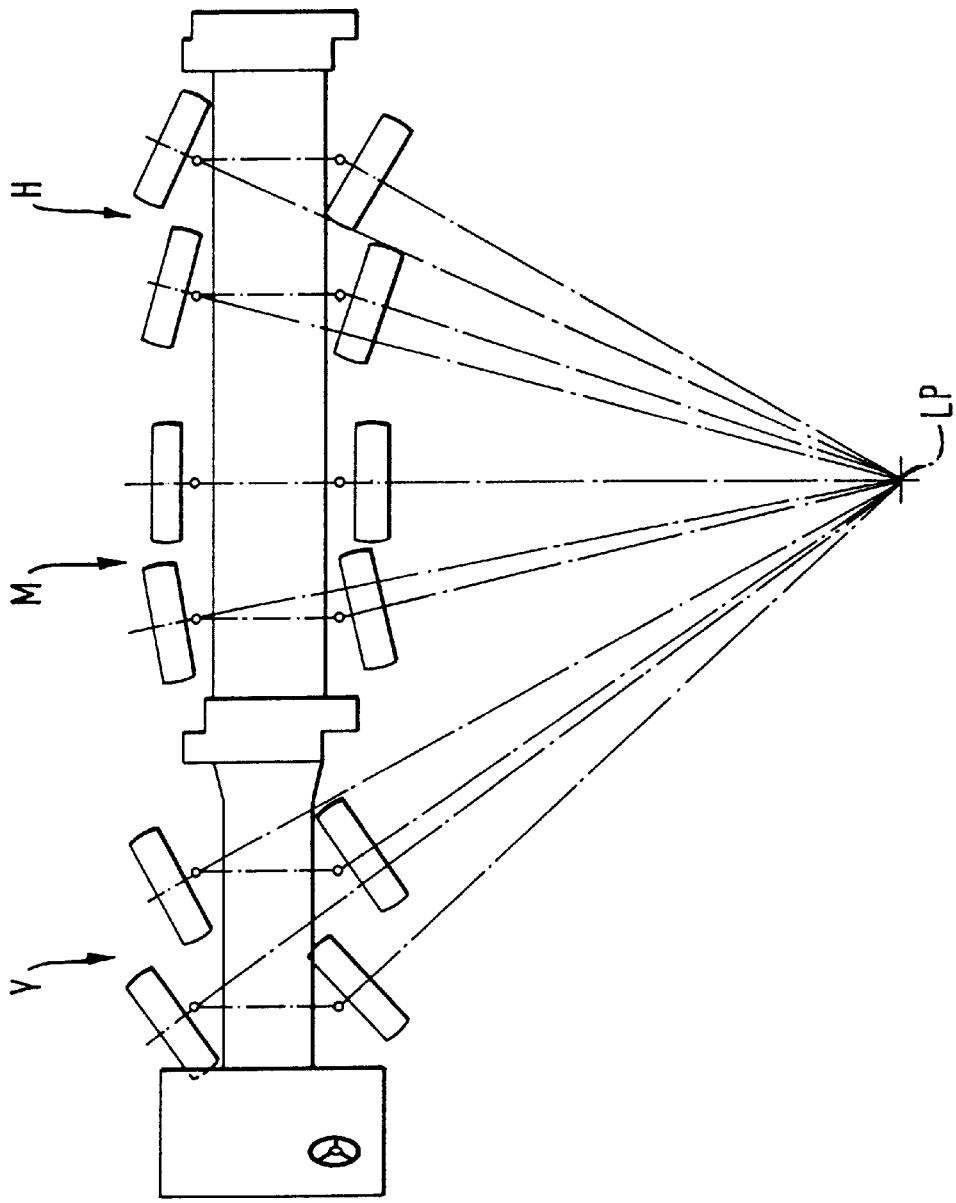
FIG. 4 shows an optimum wheel deflection setting for cornering of a six-axle vehicle.

The basic principle of the present invention will now be explained referring to FIGS. 4–8. FIG. 4 depicts a six-axle vehicle, for example a mobile crane, having a front axle arrangement Y, a middle axle arrangement M and a rear axle arrangement H. Each of the axle arrangements Y, M, H includes two axles with two wheels each. FIG. 4 shows the ideal situation of the wheel setting for cornering, in this case left-hand cornering. Each of the dot-dashed lines indicates the axis of rotation of an individual wheel. It will be appreciated that all of the axes of rotation shown meet at a point, namely the steering pole LP. In such a cornering situation that all wheels roll on a circular path about the steering pole LP, no movement occurs in the direction of the axes of rotation of the wheels, i.e., perpendicular to the direction of forward travel, and thus no scrubbing or friction of the wheels on the surface of the ground occurs. This thus represents an optimum steered deflection.

Figure 5:
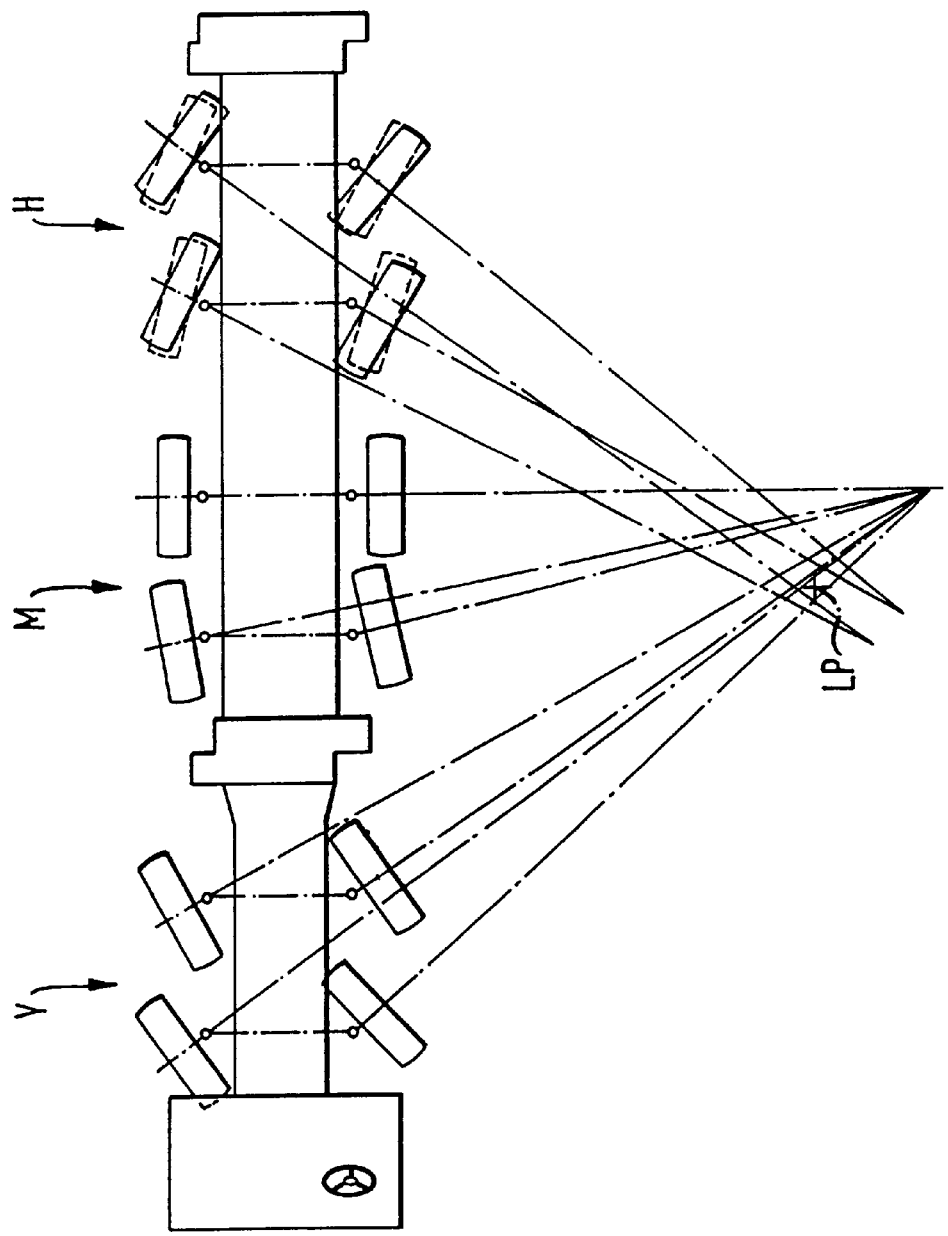
FIG. 5 sows the shift in the steering pole when the wheels of the rear axle arrangement are deflected more strongly by a conventional steering system.

FIG. 5 illustrates what happens when the wheels of an axle are deflected more strongly to reduce the radius of the turning circle. The intention here, in comparison to the condition shown in FIG. 4, is to negotiate higher left-hand cornering. For this purpose the wheels of the rear axle arrangement H are deflected more strongly, while the wheels of the front and middle axle arrangements Y and M remain in position. As is clearly evident from FIG. 5, the steering pole shifts forwards because of the stronger wheel deflection of the rear axle arrangement, i.e., where the axes of rotation of the rear wheels intersect the axes of rotation of the front wheels. The center of this intersection defines the steering pole LP. When the wheels of the middle axle arrangement M, as is the case of the prior art, remain in their starting position, the axes of rotation of these wheels no longer pass through the region of the steering pole LP. Consequently, the wheels of the middle axle arrangement M scrub on the surface of the ground, and thus are subjected to higher wear. This "off tune" setting of the middle axle arrangement M also obstructs forward movement of the vehicle.

Figure 6:
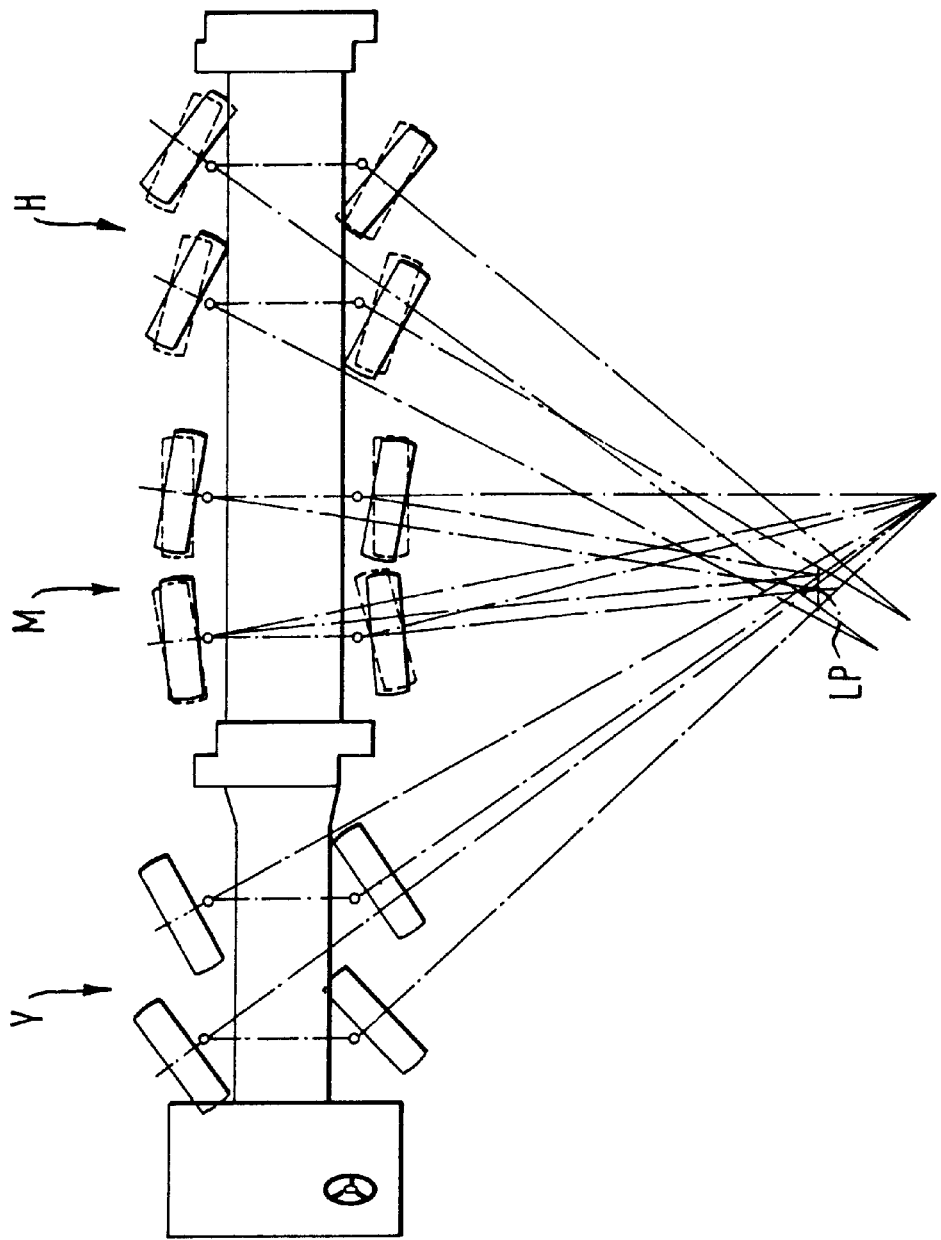
FIG. 6 shows the shift in the steering pole when the wheels of the rear axle arrangement are deflected more strongly by the steering system according to the present invention.

FIG. 6 shows the wheel setting for the middle axle arrangement M following a steering correction permitted by the steering system according to the present invention. Due to a controlled steering correction, calculated in response to the ratio of the wheel deflection angles of the front axle arrangement Y to the rear axle arrangement H, the wheels of the middle axle arrangement M are placed in a position in which their axes of rotation pass through the region identified by the steering pole LP (region of intersection of the axes of rotation by the front and rear axle arrangements Y and H). Accordingly, after steering correction, the ideal situation is substantially reattained, i.e., all wheels roll substantially on a circular path about the steering pole LP, thus substantially avoiding wheel scrub and obstruction of forward movement.

Figure 7:
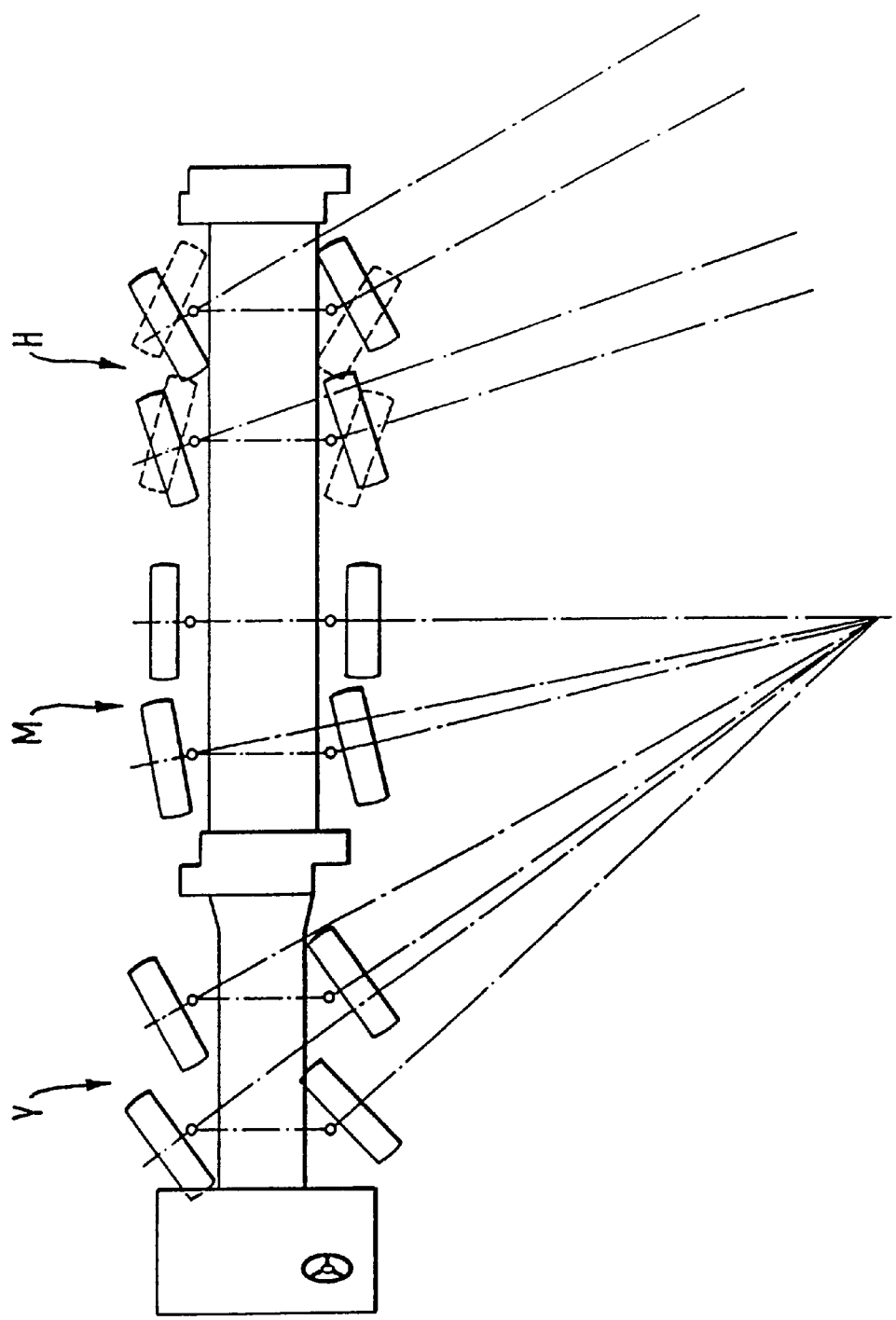
FIG. 7 shows the wheel setting achieved by a conventional steering system when "dog trotting;"

FIG. 7 shows the initial wheel setting for dog trotting, i.e., travelling skew without rotation of the vehicle's longitudinal axis. As shown on the right in FIG. 7, the wheels of the rear axle arrangement H are steered at substantially the same angle as the wheels of the front axle arrangement Y. To ensure optimum forward travel in this case, all wheels of the vehicle need to be angled as such, including the wheels of the middle axle arrangement M. With conventional steering systems this is impossible due to the steering kinematics needed for on road travel; namely, the middle axle arrangement M mounted totally rigid or permitting only minimum steering to ensure smooth on road travel (which usually affects only one axle).

It will be readily appreciated that a vehicle having a wheel setting as shown in FIG. 7, i.e., for dog trotting, is hardly capable of moving forward since the wheels of the middle axle arrangement M scrub the ground quite strongly. This is why, conventionally, the wheels of the middle axle arrangement M are lifted, and, as a result of which the weight of the vehicle and any load is distributed to other axles and steering is hampered.

Figure 8:
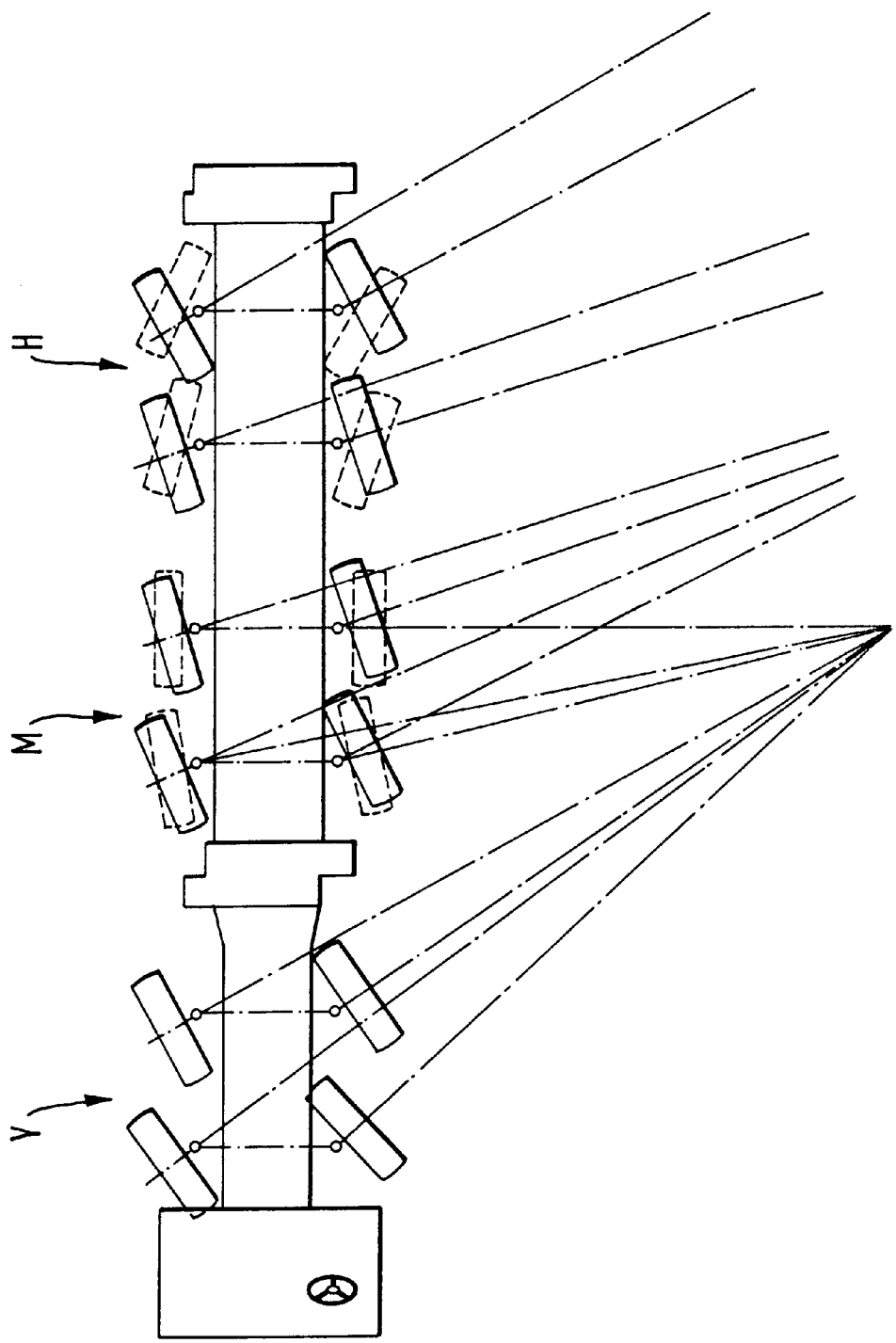
FIG. 8 shows the wheel setting achieved by the steering system according to the present invention when "dog trotting.

FIG. 8 illustrates a possible solution to this problem permitted by the steering system according to the present invention. The steering of the wheels of the middle axle arrangement M is corrected, and the middle axle arrangement M receives at least substantially the same steered deflection as the wheels of the front axle arrangement Y and the rear axle arrangement H.

FIG. 8 shows that a parallel arrangement can be attained, at least approximately so, and thus substantially frictionless forward movement is achieved. Accordingly, it is no longer necessary to lift the wheels of the middle axle arrangement M. Instead, these wheels can remain on the ground and contribute towards bearing the weight of the vehicle. This takes the load off of the front and rear axle arrangement Y, H as compared to conventional steering systems. In addition to the effect of reduced wheel wear, steering is also facilitated without overloading the steering linkage.

Figure 1:
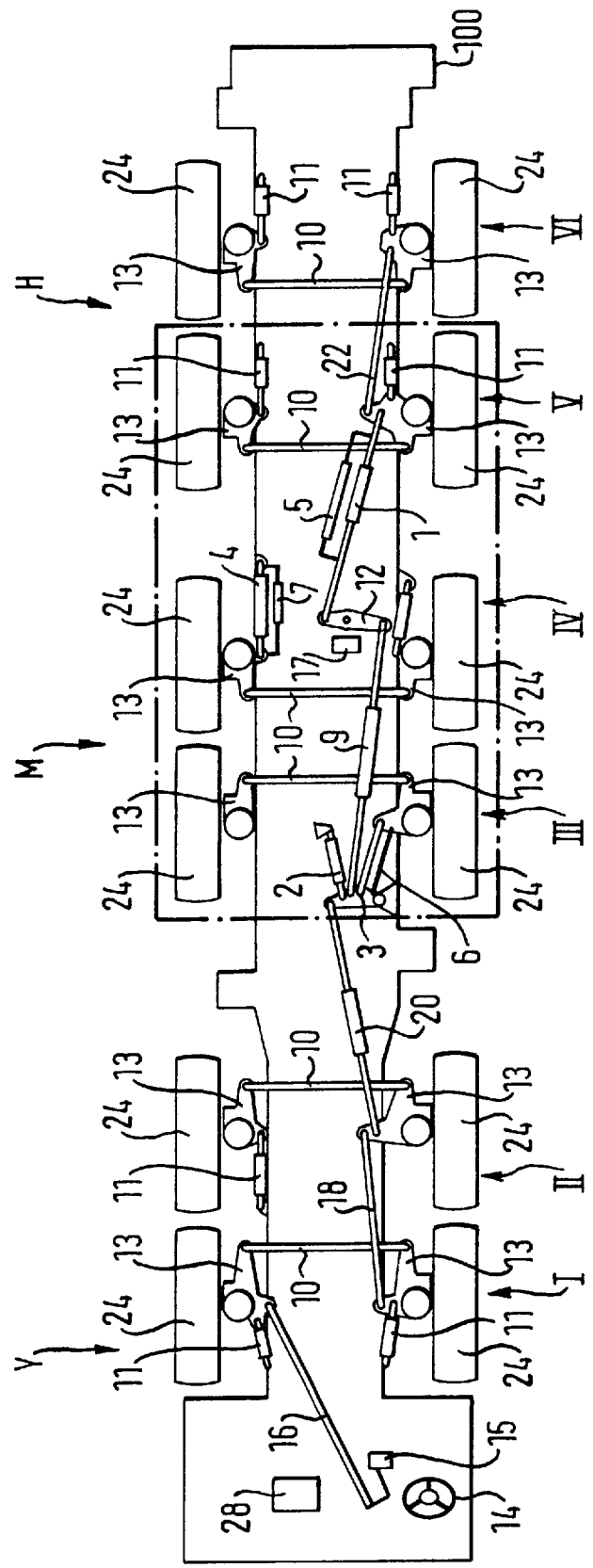
FIG. 1 is a view from above of a steering system having a front, a middle, and a rear axle arrangement and the corresponding linkage or cylinder arrangements for one embodiment of a steering system in accordance with the present invention.

FIG. 1 is a schematic illustration of a six-axle vehicle, in this case a mobile crane, employing an embodiment of the steering system according to the present invention. It should be understood, however, that the present invention is not limited in application to a six-axle vehicle, but instead, can be applied to numerous multiple-axle vehicles having more or less than six axles.

As shown in FIG. 1, the six-axle vehicle has a front axle arrangement Y, a middle axle arrangement M, and a rear axle arrangement H. The front axle arrangement Y includes a first axle I and second axle II, the middle axle arrangement includes a third axle III and fourth axle IV, and the rear axle arrangement H includes a fifth axle V and a sixth axle VI. Each of the first through sixth axles I–VI are mounted to a chassis 100 of the vehicle.

As further shown in FIG. 1, a wheel 24 is pivotally connected to each end of each of the first-sixth axles I–VI by a steering lever 13. Furthermore, each pair of steering levers 13 disposed on either end of an axle are connected by a track rod 10. Except for the third and fourth axles III–IV, a steering cylinder 11 is connected between the chassis 100 and each steering lever 13 disposed at either end of each of the first-sixth axles I–VI.

A first steering rod 16 is connected between one of the steering levers 13 for the first axle I and a steering wheel linkage 14 for the vehicle. The steering wheel linkage 14 transfers desired steering input by an operator via a steering wheel to the first steering rod 16, and this desired steering is transferred by the first steering rod 16 to the steering lever 13 of the first axle I. An optional steering sensor 15 detects the desired steering.

A second steering rod 18, connected between one of the steering levers 13 for the first axle I and one of the steering levers 13 for the second axle II, transfers the desired steering from the first axle I to the second axle II. Similarly, a third steering rod 20, connected to one of the steering levers 13 for the second axle II, transfers the desired steering from the steering arrangement for the front axle arrangement Y to the steering arrangement for the middle axle arrangement M.

Figure 2:
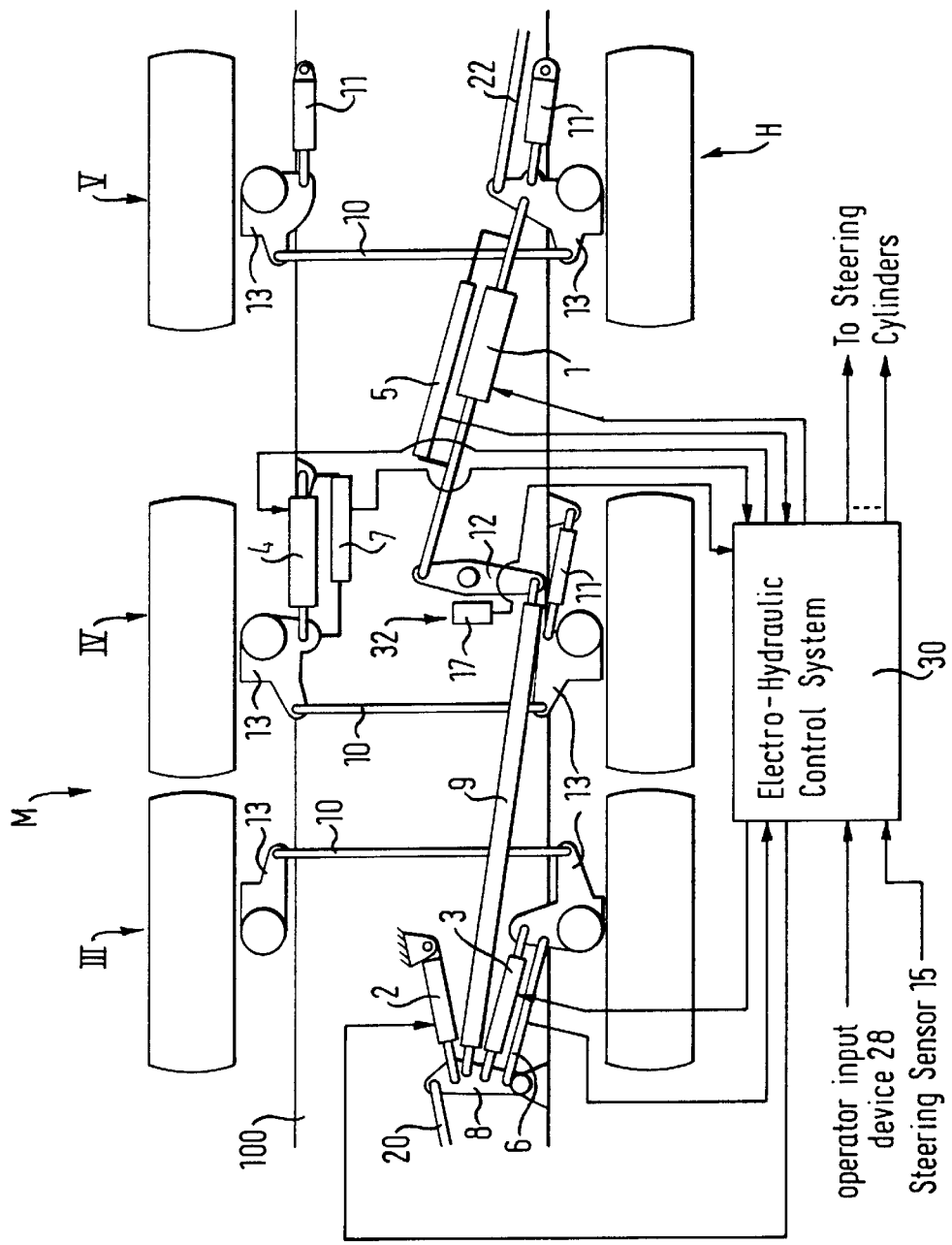
FIG. 2 is a detailed illustration of the steering system relative to the two middle axles and fifth axle of the steering system shown in FIG. 1.

FIG. 2 illustrates the middle axle arrangement M, the steering arrangement therefor, a portion of the rear axle arrangement H, and the steering arrangement therefor. As shown in FIG. 2, the third steering rod 20 is connected to a first end of a selection lever 8, and a second end of the selection lever 8 is pivotally connected to the chassis 100. A first lockable steering cylinder 3 is connected between the selection lever 8 and one of the steering levers 13 for the third axle III. A first linear potentiometer 6 is similarly connected, and measures the length of the first lockable steering cylinder 3.

A high torque steering cylinder 2 is connected between the selection lever 8 and the chassis 100. As briefly mentioned above, the third axle III does not include steering cylinders 11 associated with each steering lever 13. Instead, the high torque steering cylinder 2 is used. The high torque steering cylinder 2 produces twice the amount of torque of a single steering cylinder 11.

With respect to the fourth axle IV, a steering cylinder 11 is connected between one of the steering levers 13 and the chassis 100. However, a second lockable steering cylinder 4 is connected between the chassis 100 and the other steering lever 13 for the fourth axle IV. A second linear potentiometer 7 is similarly connected, and measures the length of the second lockable steering cylinder 4.

An adjustable connector 32 serves to transfer the desired steering from the steering arrangement for the middle axle arrangement M to the steering arrangement for the rear axle arrangement H. The adjustable connector 32 includes a selector lever 12 pivotally connected to the chassis 100 between the fourth axle IV and the fifth axle V. The adjustable connector 32 further includes a fourth steering rod 9, connected between the selection lever 8 and a first end of the selector lever 12, and a lockable, telescopic steering rod 1, connected between a second end of the selector lever 12 and one of the steering levers 13 for the fifth axle V.

As shown in FIG. 2, the pivot point for the selection lever 12 lies between the connections of the fourth steering rod 9 and the lockable, telescopic steering rod 1 to the selector lever 12. A third linear potentiometer 5 is connected to either end of the lockable, telescopic steering rod 1, and measures the length of the lockable, telescopic steering rod 1. An optional rotary sensor 17 measures the rotation of the selector lever 12 and the direction of rotation. Accordingly, either the steering sensor 15 or the rotary sensor 17 can be used to detect the desired steering, and the other sensor eliminated from the steering system.

Referring back to FIG. 1, a fifth steering rod 22 is connected between one of the steering levers 13 of the fifth axle V and one of the steering levers 13 of the sixth axle VI, and serves to transfer the desired steering from the fifth axle V to the sixth axle VI.

As shown in FIG. 2, the steering system according to the present invention further includes an electro-hydraulic control system 30 which receives the output from the first, second, and third linear potentiometers 6, 7, and 5, the output of the steering sensor 15 or the rotary sensor 17, and the output of the an operator input device 28. The operator input device 28 is shown in FIG. 1, and receives operator input regarding a driving mode of operation discussed in more detail below. The electro-hydraulic control system 30, based on the received inputs, controls the operation of the lockable, telescopic steering rod 1, the first lockable steering cylinder 3, the second lockable steering cylinder 4, the high torque steering cylinder 2, and the steering cylinders 11. For the purposes of clarity, each individual connection between the electro-hydraulic control system 30 and the steering cylinders 11 has not been shown, but merely indicated in FIG. 2.

In a preferred embodiment, the electro-hydraulic control system 30 includes a central processing unit CPU connected to a read only memory ROM and a random access memory RAM. The CPU in cooperation with the ROM and RAM receive and process the various inputs, and generate control signals for controlling a hydraulic system, which directly controls the operation of the various components controlled by the electro-hydraulic control system 30 as discussed above. In an alternative embodiment, the electro-hydraulic system 30 could be embodied by an entirely electrical or electrical/mechanical system.

The operation of the present invention will now be described in detail. Using the operator input device 28, an operator of the multiple-axle vehicle can select one of at least three different driving modes: an on road or normal driving mode, an off road mode, and a dog trotting or crab steering mode. When driving on road, the ability to corner tightly or dog trot is not required. Instead, smooth stable steering is desired. This is achieved when the wheels of the middle axles in a multiple-axle vehicle are locked in position or allowed to pivot only slightly.

Accordingly, when driving on road, the electro-hydraulic control system 30 locks the first lockable steering cylinder 3 and the second lockable steering cylinder 4. Additionally, the electro-hydraulic control system 30 locks the lockable, telescopic steering rod 1 at a base length, which is a length that sets the ratio of the steering angle deflection of the steering arrangement for the front axle arrangement Y to the steering arrangement for the rear axle arrangement H (hereinafter "the deflection ratio") to one.

FIGS. 3a), 3c), and 3g) illustrate the steering angle deflection of the wheels 24 attached to each axle during on road travel, the length of the lockable, telescopic steering rod 1 and the position of the lockable, telescopic steering rod 1 with respect to a left-hand mounting rod 50 and a right-hand mounting rod 52. The left-hand mounting rod 50 corresponds to a steering lever 13 in the steering arrangement for the front axle arrangement Y, while the right-hand mounting rod 52 corresponds to a steering lever 13 in the steering arrangement of the rear axle arrangement H. As shown in FIG. 3a, during straight ahead travel the wheels 24 of each axle have no steering angle deflection. When left hand cornering as shown in FIG. 3c), the wheels 24 of the fourth axle IV have no steering angle deflection, while the wheels 24 of the third axle III have only a slight steering angle deflection. A similar situation is observed when right-hand cornering as shown in FIG. 3g).

When cornering during on road travel, the steering sensor 15 or the rotary sensor 17 detects the amount of desired steering, and the electro-hydraulic control system 30 controls the operation of the steering cylinders 11 based on the detected desired steering. Accordingly, the steering cylinders 11 provide a power assist to the steering which occurs as a result of the mechanical link between the steering arrangement for each of the first-sixth axles I–VI provided by the first steering rod 16, the second steering rod 18, the third steering rod 20, the fourth steering rod 9, the lockable, telescopic steering rod 1, and the fifth steering rod 22. The combination of a mechanical steering linkage assisted by the electro-hydraulic system 30 achieves a wheel positioning only achievable in the conventional art by complicated independent steering systems, which provide dubious off road steering.

If the operator selects the off road mode of operation via the operator input device 28, the electro-hydraulic control system 30 continues to control the steering cylinders 11 for the first, second, fifth, and sixth axles I, II, V, and VI based on the output of the steering sensor 15 or the rotary sensor 17. But, the electro-hydraulic control system 30 unlocks the first lockable steering cylinder 3, the second lockable steering cylinder 4, and the lockable, telescopic steering rod 1. By unlocking the lockable, telescopic steering rod 1, the steering arrangement for the rear axle arrangement H is uncoupled from the steering arrangement for the front axle arrangement Y, as illustrated in FIGS. 3d and 3h. In other words, the desired steering transferred by the first steering rod 16, second steering rod 18, and third steering rod 20 to the fourth steering rod 9 is not then necessarily transferred by the lockable, telescopic steering rod 1. Instead, the electro-hydraulic control system 30 can change the length of the lockable, telescopic steering rod 1 to control the amount of influence the mechanical transfer of the desired steering has on the steering arrangement for the rear axle arrangement H.

When an operator indicates a desire to corner tightly by actuation of the steering wheel linkage 14, the electro-hydraulic control system 30 detects this situation based on the output of the steering sensor 15 or the rotary sensor 17, and controls the steering cylinders 11 for the first, second, fifth, and sixth axles I, II, V, and VI and the length of the telescopic steering rod 1 to achieve the tighter turning radius. As discussed above, the steering pole for the multiple-axle vehicle then shifts such that, absent some type of correction, the axes of rotation of the third and fourth axles III and IV are no longer oriented to the steering pole.

In the present invention, however, the third linear potentiometer 5 provides the electro-hydraulic control system 30 with output indicating the length of the lockable, telescopic steering rod 1. Because the deflection ratio (i.e., ratio of the steering angle deflection for the front axle arrangement Y to the steering angle deflection for the rear axle arrangement H) is known when the lockable, telescopic steering rod 1 is at its base position or length, the electro-hydraulic control system 30 can determine the deflection ratio from the output of the third linear potentiometer 5 when the length of the lockable, telescopic steering rod 1 changes. Based on the determined deflection ratio, the electro-hydraulic control system 30 determines steering angle deflections for the wheels 24 of the third axle III and the fourth axle IV which would orient the axes of rotation therefor to the steering pole. The electro-hydraulic control system 30 then controls the high torque steering cylinder 2, the first lockable steering cylinder 3, the second lockable steering cylinder 4, and the steering cylinder 11 for the fourth axle IV to achieve the thusly determined steering angle deflections. The output of the first and second linear potentiometers 6 and 7 allow the electro-hydraulic control system 30 to monitor the steering angle deflections for the wheels 24 of the third and fourth axles III and IV for accurate positioning thereof. In this manner, the steering of the multiple-axle vehicle is optimized such that the axes of rotation for the axles of the multiple-axle vehicle are oriented to the steering pole, and the friction caused by wheels scrubbing against the surface of the ground during tight cornering is eliminated.

As the discussion above demonstrates, by properly controlling the lockable, telescopic steering rod 1 and the steering arrangement for the middle axle arrangement M, the electro-hydraulic control system 30 can substantially, independently control the steering angle deflection of the third axle III and the fourth axle IV forming the middle axle arrangement M.

FIGS. 3b) and 3f) illustrate possible positions for the wheels 24 during left hand tight cornering and right-hand tight cornering, respectively. Additionally, these figures show the length of the lockable, telescopic steering rod 1 in terms of the deflection ratio and the position of the lockable, telescopic steering rod 1 with respect to the left-hand mounting point 50 and the right hand mounting point 52.

Operation in the dog trotting mode is similar to that in the off road mode in that the electro-hydraulic control system 30 continues to control the steering cylinders 11 for the first, second, fifth, and sixth axles I, II, V, and VI based on the output of the steering sensor 15 or the rotary sensor 17; unlocks the first lockable steering cylinder 3, the second lockable steering cylinder 4 and the lockable, telescopic steering rod 1; determines the deflection ratio based on the output of the third linear potentiometer 5; and controls the steering angle deflection of the wheels 24 mounted to the third axle III and the fourth axle IV based on the determined deflection ratio and the output of the first and second linear potentiometers 6 and 7. However, in the dog trotting mode, the electro-hydraulic control system 30 controls the high torque steering cylinder 2, the first lockable steering cylinder 3, the second lockable steering cylinder 4, the steering cylinders 11, and the lockable, telescopic steering rod 1 such that the axes of rotation for the wheels 24 attached to the first-sixth axles I–VI are substantially parallel.

As discussed above, in conventional steering systems during skew travel where the multiple-axle vehicle travels to the left or right without the longitudinal axis thereof rotating, the middle axles had to be placed in a stowed position. By contrast, the middle axles in a multiple-axle vehicle equipped with the steering system according to the present invention, do not need stowed because the wheels attached thereto have their axes of rotation oriented parallel to the axes of rotation for the wheels attached to the remaining axles. As a result, the middle axles help bear the load placed on the multiple-axle vehicle.

FIGS. 3e) and 3i) illustrate the position of the wheels 24 during dog trotting or skew travel to the left and the right, respectively. These figures also illustrate the length of the lockable, telescopic steering rod 1, and the position of the lockable, telescopic steering rod 1 with respect to the left hand mounting point 50 and the right hand mounting point 52. As shown in FIG. 3e), the length of the lockable, telescopic steering rod 1 is set to a maximum during skew travel to the left, while the length of the lockable telescopic steering rod is set to a minimum during skew travel to the right (see FIG. 3i)).

It should be understood that the steering system according to the present invention is not limited to the example described above. While shown applied to a six-axle vehicle, the present invention can be applied to a multiple-axle vehicle having more or less than six axles. While the deflection ratio is determined based on the output of a linear potentiometer connected to either end of the lockable, telescopic steering rod 1, sensors measuring the absolute steering deflection angle of the steering arrangement for the front axle arrangement Y and the rear axle arrangement H could be used. Furthermore, linear potentiometer 5, or the alternative sensors for measuring the steering deflection angle of the front and rear steering arrangements to not have to be linear potentiometers, but equivalently could be rotary sensors.

Figure 9:
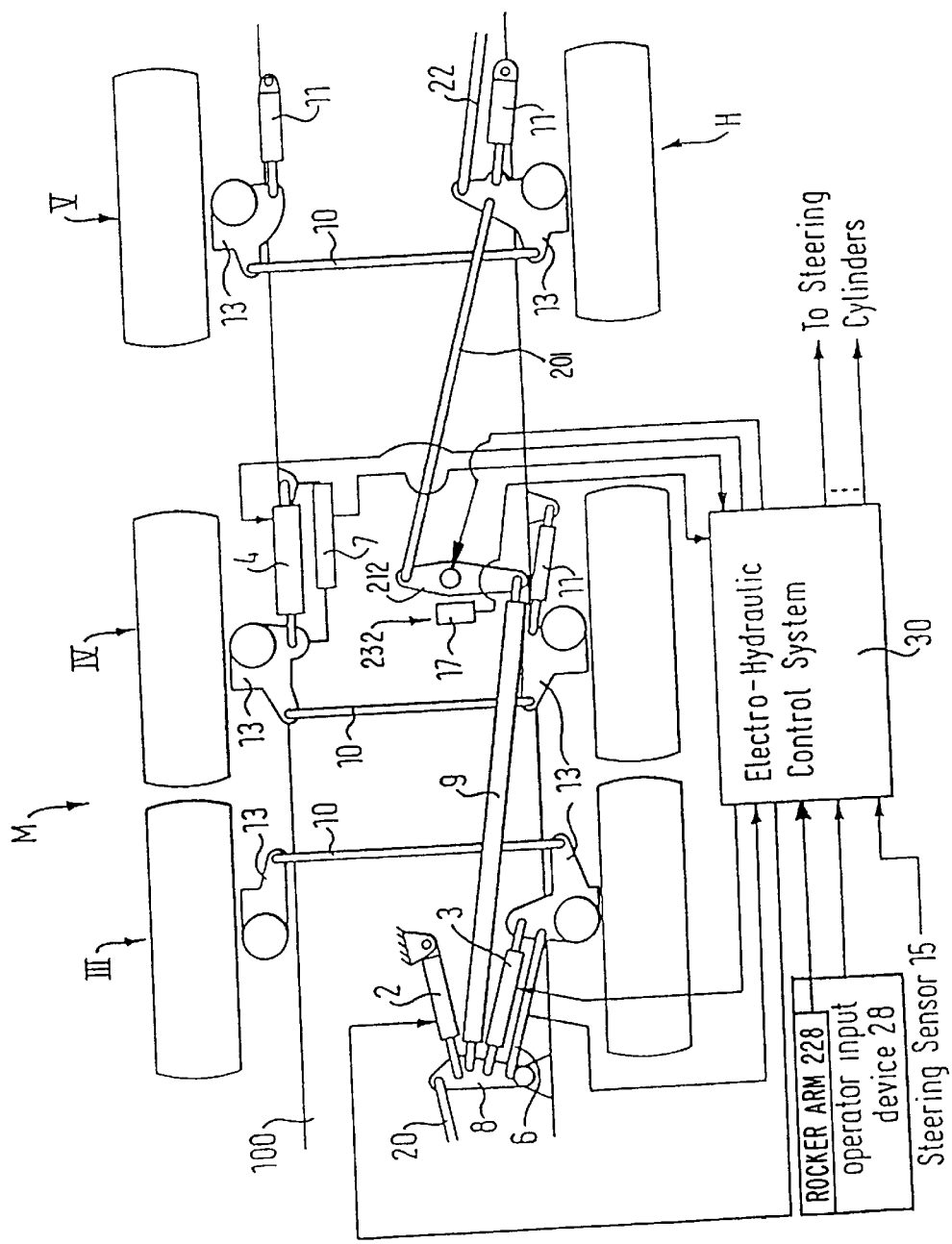
" and FIG. 9 is a detailed illustration of the steering system relative to the two middle axles and fifth axle according to another embodiment of the present invention.

As shown in FIG. 9, instead of selector lever 12 and telescopic steering rod 1, an adjustable connector 232 can include lockable selector lever 212 and steering rod 201. Also, the adjustable connector 232 of this embodiment does not include the linear potentiometer 5, and uses, instead, the output of the rotary sensor 17. In this embodiment, the lockable selector lever 212 is unlocked to decouple the steering arrangements for the rear axle and front axle arrangements H and Y. Accordingly, the adjustable connector 232 operates in the same manner as the adjustable connector 32 with the lockable selector lever 212 being locked and unlocked instead of the lockable telescopic rod 1. FIG. 9 also illustrates a further alternative of the present invention, also applicable to the embodiment in FIGS. 1–2. As shown, the operator input device 28 includes a rocker arm sensor 228.

In addition to the above discussed modes of operation, an independent steering mode can be selected by an operator using the operator input device 28. In the independent steering mode, the electro-hydraulic control system 30 decouples the steering arrangements for the front and rear axle arrangements Y and H, and unlocks the first and second lockable steering cylinders 3 and 4.

The steering wheel 14, as assisted by the electro-hydraulic control system 30, controls the steering arrangement for the front axle arrangement Y and the third axle III. Furthermore, the electro-hydraulic control system 30 corrects the steering for the wheels 24 of the third axle III and controls the steering of the wheels 24 for the fourth axle IV based on the deflection ratio. Also in the independent steering mode, the operator indicates the desired steering for the steering arrangement of the rear axle arrangement H by operation of the rocker arm 228, and the electro-hydraulic control system 30 controls the steering arrangement for the rear axle arrangement H based on this desired steering.

As a still further alternative, besides controlling the locked/unlocked state of the first and second lockable steering cylinders 3 and 4, the electro-hydraulic control system 30 can control the operation thereof to further assist in obtaining the desired steering in the above-described embodiments.

Furthermore, it will be understood that FIGS. 3a)–3i) merely disclose possible wheel positions during on road travel, tight cornering, and skew travel, and that numerous other possible wheel positions exist for these modes of operation. It will also be understood that, depending upon at least the number of axles in the multiple-axle vehicle and the desired wheel positions during the various operating modes, it is within the level of skill of one skilled in the art to adapt the electro-hydraulic control system 30 to a particular multiple-axle vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering system for a multiple-axle vehicle, comprising:
    a front axle steering arrangement steering at least one pair of front wheels connected to at least one front axle;
    a middle axle steering arrangement steering at least one pair of middle wheels connected to at least one middle axle;
    a first connector operationally connecting said middle axle steering arrangement to said front axle steering arrangement;
    a rear axle steering arrangement steering at least one pair of rear wheels connected to at least one rear axle; and
    an adjustable connector adjustably connecting said middle axle steering arrangement to said rear axle steering arrangement, wherein said adjustable connector is a mechanical connector that allows said at least one pair of rear wheels to be selectively steered, independent of any steering of said at least one pair of middle wheels.

2. The steering system of claim 1, wherein said adjustable connector adjusts such that said rear axle steering arrangement operates independently of said front axle steering arrangement.

3. The steering system of claim 1, wherein said front, middle and rear axle steering arrangements, said first connector and said adjustable connector allow substantially independent angular deflection of at least said middle wheels.

4. The steering system of claim 1, wherein
said adjustable connector includes a telescopic steering rod.

5. The steering system of claim 4, wherein said adjustable connector further comprises:
a sensor measuring a length of said telescopic steering rod.

6. The steering system of claim 4, wherein said telescopic steering rod is lockable.

7. The steering system of claim 1, wherein said middle axle steering arrangement steers at least first and second wheels connected to at least one middle axle, said middle axle steering arrangement including,
first and second steering levers associated with said first and second wheels, respectively;
a first track rod connecting said first and second steering levers;
a selection lever pivotally connected to a first fixed support;
a first steering cylinder connected between a second fixed support and said selection lever; and
a second steering cylinder connected between said selection lever and said second steering lever.

8. The steering system of claim 7, wherein said first connector is connected between said front axle steering arrangement and said selection lever.

9. The steering system of claim 7, wherein said adjustable connector comprises:
a selector lever pivotally connected to a third fixed support;
a steering push rod connected between said selection lever and said selector lever; and
a telescopic cylinder connected between said selector lever and said rear axle steering arrangement.

10. The steering system of claim 9, wherein said telescopic cylinder is lockable.

11. The steering system of claim 1, wherein said middle axle steering arrangement includes lockable steering cylinders.

12. The steering system of claim 11, wherein said middle axle steering arrangement further includes a sensor associated with at least one of said lockable steering cylinders and measuring a length of said associated lockable steering cylinder.

13. The steering system of claim 1, wherein said middle axle steering arrangement includes a steering cylinder which produces torque double a torque produced by a steering cylinder in said rear axle steering arrangement.

14. The steering system of claim 1, wherein said middle axle steering arrangement in cooperation with said adjustable connector orients axes of rotation for said middle wheels to a steering pole of said vehicle, said steering pole is substantially a point of intersection of axes of rotation for said front wheels and said rear wheels.

15. The steering system of claim 1, wherein said middle axle steering arrangement in cooperation with said adjustable connector orients axes of rotation for said middle wheels substantially parallel to axes of rotation for said front and rear wheels.

16. The steering system of claim 1, wherein
said adjustable connector includes a steering rod connected to a rotatable and lockable selector lever.

17. A steering system for a multiple-axle vehicle, comprising:
a front axle steering arrangement steering at least one pair of front wheels connected to at least one front axle;
a middle axle steering arrangement steering at least one pair of middle wheels connected to at least one middle axle;
a first connector operationally connecting said middle axle steering arrangement to said front axle steering arrangement;
a rear axle steering arrangement steering at least one pair of rear wheels connected to at least one rear axle; and
a second connector operationally connecting said middle axle steering arrangement to said rear axle steering arrangement;
determining means for determining a ratio of a steering deflection angle of said front wheels to a steering deflection angle of said rear wheels; and
a controller controlling said middle axle steering arrangement based on said ratio.

18. The steering system of claim 17, wherein said second connector is an adjustable connector which adjustably connects said middle and rear axle steering arrangements.

19. The steering system of claim 18, wherein said controller adjusts said adjustable connector such that said rear axle steering arrangement operates independently of said front axle steering arrangement.

20. The steering system of claim 18, wherein said controller adjusts said adjustable connector to allow substantially independent angular deflection of at least said middle wheels.

21. The steering system of claim 18, wherein said adjustable connector includes a telescopic steering rod.

22. The steering system of claim 21, wherein
said determining means includes a sensor measuring a length of said telescopic steering rod, and determines said ratio based on output from said sensor.

23. The steering system of claim 21, wherein said telescopic steering rod is lockable.

24. The steering system of claim 18, wherein said controller controls said adjustable connector and said middle axle steering arrangement to orient axes of rotation for said middle wheels to a steering pole of said vehicle in at least one driving mode of operation, said steering pole is substantially a point of intersection of axes of rotation for said front wheels and said rear wheels.

25. The steering system of claim 18, wherein said controller controls said adjustable connector and said middle axle steering arrangement to orient axes of rotation for said middle wheels substantially parallel to axes of rotation for said front and rear wheels in at least one driving mode of operation.

26. The steering system of claim 17, wherein said middle axle steering arrangement includes lockable steering cylinders.

27. The steering system of claim 26, wherein said middle axle steering arrangement further includes a sensor, associated with at least one of said lockable steering cylinders, measuring a length of said associated lockable steering cylinder.

28. The steering system of claim 27, wherein said controller controls said middle axle steering arrangement based on output of said sensor.

29. The steering system of claim 17, wherein said front, middle, and rear steering arrangements are mechanically actuated via at least said first and second connectors, and said controller controls fluid motors included in said front, middle, and rear steering arrangements to assist said mechanical actuation.

30. A steering system for a multiple-axle vehicle, comprising:

a front axle steering arrangement steering at least one pair of front wheels connected to at least one front axle;

a middle axle steering arrangement steering at least one pair of middle wheels connected to at least one middle axle;

a first connector connecting said middle axle steering arrangement to said front axle steering arrangement for mechanically causing steering of said at least one pair of middle wheels in response to steering of said at least one pair of front wheels;

a rear axle steering arrangement steering at least one pair of rear wheels connected to at least one rear axle; and a second connector connecting said middle axle steering arrangement to said rear axle steering arrangement for mechanically causing steering of said at least one pair of rear wheels in response to steering of said at least one pair of middle wheels, wherein said first connector and said second connector allow said at least one pair of front wheels, said at least one pair of middle wheels, and said at least one pair of rear wheels to be simultaneously turned to face common parallel directions to one side of the multiple-axle vehicle, such that the multiple-axle vehicle can be crab steered.

31. The steering system of claim 30, wherein said second connector is an adjustable connector which permits said rear axle steering arrangement to operate independently of said middle axle steering arrangement.

32. The steering system of claim 31, wherein said adjustable connector includes a telescopic steering rod.

33. The steering system of claim 31, wherein said adjustable connector includes a steering rod connected to a rotatable and lockable selector lever.

* * * * *